United States Patent [19]

Ulsky

[11] 4,394,983
[45] Jul. 26, 1983

[54] TIRE AND REFUSE SHREDDER

[75] Inventor: Carl M. Ulsky, Lake Stevens, Wash.

[73] Assignee: KACA Corporation, Lake Stevens, Wash.

[21] Appl. No.: 239,219

[22] Filed: Mar. 2, 1981

[51] Int. Cl.³ .............................................. B02C 18/18
[52] U.S. Cl. ................................ 241/243; 241/285 B; 241/294; 241/DIG. 31
[58] Field of Search ............... 241/243, 285 A, 285 B, 241/294, DIG. 31

[56] References Cited

U.S. PATENT DOCUMENTS

| 2,853,247 | 9/1958 | Anderson | 241/285 B X |
| 3,991,944 | 11/1976 | Baikoff | 241/DIG. 31 X |
| 4,090,670 | 5/1978 | Bennett | 241/DIG. 31 |
| 4,099,678 | 7/1978 | Brewer | 241/243 |
| 4,119,277 | 10/1978 | Snyder | 241/DIG. 31 X |
| 4,125,228 | 11/1978 | Brewer | 241/243 |
| 4,176,800 | 12/1979 | Brewer | 241/243 |
| 4,205,799 | 6/1980 | Brewer | 241/243 |
| 4,241,882 | 12/1980 | Baikoff | 241/DIG. 31 X |

Primary Examiner—Howard N. Goldberg
Attorney, Agent, or Firm—Christensen, O'Connor, Johnson & Kindness

[57] ABSTRACT

A vehicle tire carcass or refuse shredder including a downwardly tapered feed hopper widening at the base directly overlying a stationary toothed rack and a rotary cutter assembly, the latter comprising a plurality of disk-like cutters interdigitated with the rack teeth. The cutter disks each carry cutter bits at 180° spacing, each with obliquely angled leading cutting edges and sloping rearwardly and radially inward from each of said leading cutting edges. The side edges of the cutter bits cooperate with the adjacent rack teeth to shear off the flaps or chunks of rubber or other material being gouged from the tire carcasses or other refuse items by the pointed tips of the cutter bits.

14 Claims, 10 Drawing Figures

TIRE AND REFUSE SHREDDER

BACKGROUND OF THE INVENTION

This invention relates to apparatus for shredding used vehicle tires; more particularly, the carcasses of such tires after removal of the rim edge reinforcing cables typically incorporated therein. Apparatus for removing these reinforcing cables preparatory to shredding is disclosed in my co-pending application, Ser. No. 186,498, filed Sept. 12, 1980 now U.S. Pat. No. 4,355,556. The present invention is herein illustratively described by reference to its presently preferred form as applied to tire shredding, considered to be the most difficult of common refuse shredder requirements; however, it will be recognized that certain modifications and changes therein with respect to details may be made without departing from the essential features involved and that the shredder mechanism may also be used in shredding other forms of refuse such as most common garbage in order to prepare if for use as an industrial fuel.

While the "shreds" of used tire carcasses have various uses, it is found they make excellent low-cost fuel for industrial applications. For such purposes, it is desirable that the pieces of material produced by a shredder be generally of the same order of size (preferably from about one square inch to a few square inches) and that the pieces be completely severed from one another, that is, not connected by strands of reinforcing material that could clog handling equipment. As such they make excellent supplemental fuel that when fed by stokers along with wood chips or coal provide low-ash, smokeless combustion. It is also important as a practical matter that the shredder cope with tires varying in wall thickness and in size and with the various types of wall reinforcement (i.e., belting) materials incorporated therein. Automobile and truck tire material being highly abrasion resistant and cut resistant, attempts to slice tire carcasses into manageable size pieces on a production basis using knives is impractical since the material, especially when mud or dirt encrusted, as is often the case, soon dulls edges of the best grades of steel. Tire material also resists abrasion, hence resists that method of comminution, and in fact it tends to melt at attempted abrasion rates even approaching practical production rates. Heat generation and resultant energy losses can also be a problem with apparatus for slicing or tearing the tire carcasses into bits. An important desirable characteristic of this invention is its capability of reducing a tire to small pieces or chunks almost wholly of a particular size range, such as that indicted previously herein, with minimum production of fines or powdery material that is not only difficult to handle, but that creates a dirt and dust problem.

The foregoing and related problem factors become of major significance when attempting to process (i.e., shred) tires at sufficiently high production rates to be useful in a sustained commercial operation, one consuming minimum energy, requiring minimum drive power, and incurring minimum interruptions for repair, sharpening or replacement of the active elements.

In a broad perspective, the present invention is directed to providing such an apparatus, a machine that can be set up at a plant or adjacent to a dump site and fed with tires of varying sizes, types and quality of materials involved with little or no attention to cleaning the tires of dust or dirt and with no requirement of distinguishing and segregating them for separate processing. Steel belted tires are shredded as readily as polyester fabric belted tires. The apparatus works as well with old, hard tire materials as it does with the newer, soft materials.

A further object of the invention is to provide such a shredder that reduces the tires to pieces of practical size for handling in bulk and burning as bulk fuel, and which inherently avoids the unnecessary energy expenditures that attend reducing the tires to pieces that are unduly small and numerous.

A further and related object is to provide an efficient tire shredder which is compact, simple, efficient, has a minimum drive power requirement, and is reliable in operation. A related purpose is to provide a machine with inherently stable self-feeding action that comes into play once the tire is delivered to its cutter means. The invention seeks and provides high-volume processing of tires with negligible interruptions due to tire cascasses and parts of carcasses hanging up or clogging the infeed hopper.

A further object is to provide such a machine which is readily maintained, and more particularly, one in which the active shredder elements (e.g., cutter bits and cooperating teeth) can be readily removed and replaced individually.

SUMMARY OF THE INVENTION

The novel tire shredder herein disclosed comprises an elongated multibit cutter mounted to turn on a horizontal axis and cooperating with a tire infeed hopper by which tires are fed or dropped edgewise against the cutter. Substantially in the horizontal midplane of the cutter is mounted an elongated horizontally extending shredder rack which includes a series of parallel anvil teeth projecting into the respective spaces between the cutter bits. Adjacent the rack and overlying the cutter, the base of the hopper widens laterally in the direction of cutter rotation to form a tumbler chamber into which tires and recirculating sections of tires are thrown by teeth of the cutter hooking into the rubber.

Cutter rotation causing the cutter bits to bite into the tire wall and drag portions of the tire material downwardly against the rack teeth, produces the desired progressive shredding of the tire into separate pieces in the desired size range as the cutter bits stretch the material against and over the teeth. Due to the close clearances between the rack teeth and cutter teeth, the action is primarily a shearing action more than it is a tearing action. The fragments are driven downwardly by the cutter bits through the spaces between rack teeth into a suitable underlying collecting bin or, as illustrated, onto an offbear conveyor.

The cutter preferably comprises an elongated arbor mounting a plurality of annular disk-like cutter bits spaced along the length of the arbor so as to mesh with a cooperatively arranged series of stationary rack teeth. The cutter bits are individually keyed to the arbor and held there by mounting screws so as to be slidably removable from the arbor for sharpening, repair or replacement. The rack teeth are likewise individually mounted on a retractable rack base or bar for separate repair and/or replacement if need be. The cutter bits have specially configured semihook-shaped leading cutting edges formed by circumferentially relieved (i.e., spiralling to a smaller diameter) outer peripheral surfaces intersecting longitudinal radial forwardly facing surfaces. The latter preferably are of dihedral reentrant form with apex lines off of center so as to produce two oppositely angled "set" faces, one wide and one narrow.

These and other features, objects and advantages of the invention, including details of the preferred form, will become more fully evident as the description proceeds with reference to the accompanying drawings.

DETAILED DESCRIPTION

In the illustrated embodiment, cutter arbor 10 comprises an elongated shaft extended through rotational journals or bearing units 12 and 14 respectively mounted in alignment on opposite upright end panels 16a and 16b of machine frame 16. Cutter 30, comprising a series of cutter disks 32 separated by spacer disks 34 on arbor 10, is accommodated between the frame panels 16a and 16b. These panels form opposite ends of what amounts to a feed hopper 35 in which the rotary cutter 30 operates on tires fed successively down into the hopper.

Figure 1:
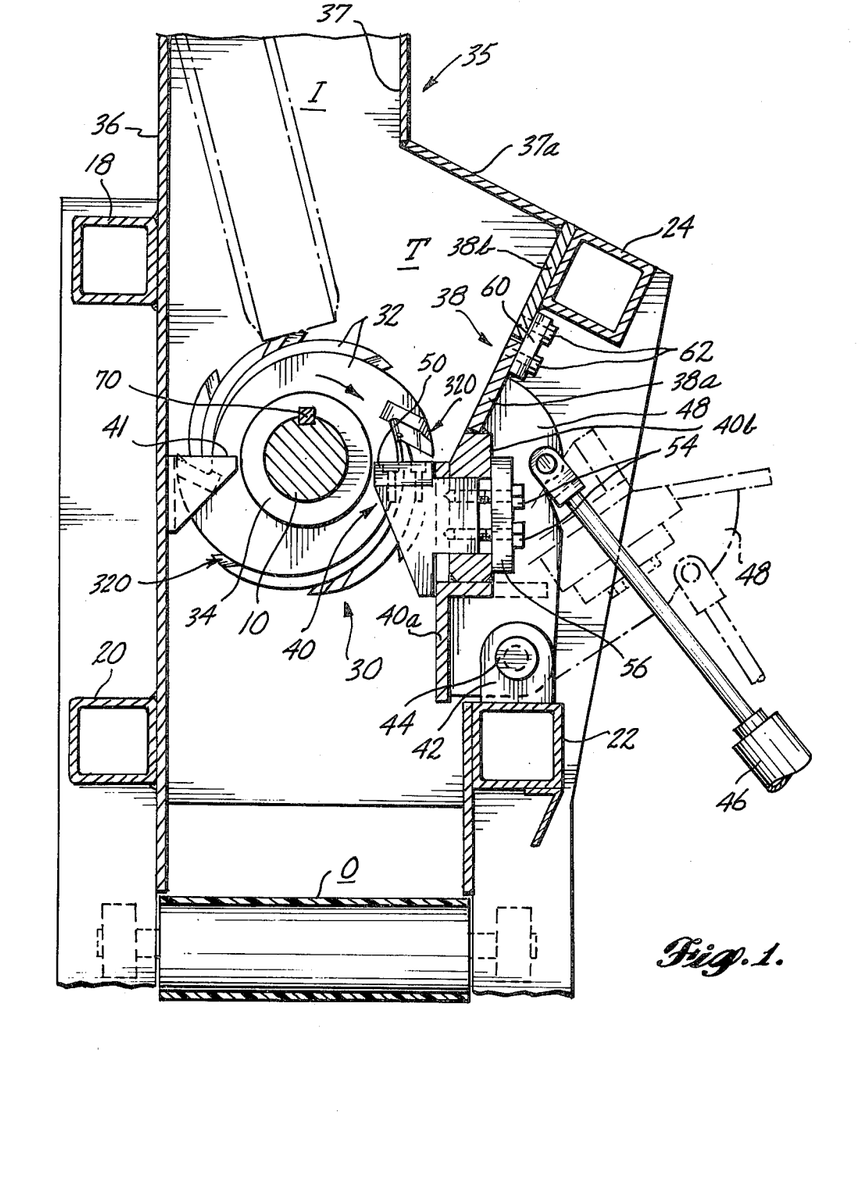
FIG. 1 is an end view of the machine taken partially in section in a vertical plane.
Figure 2:
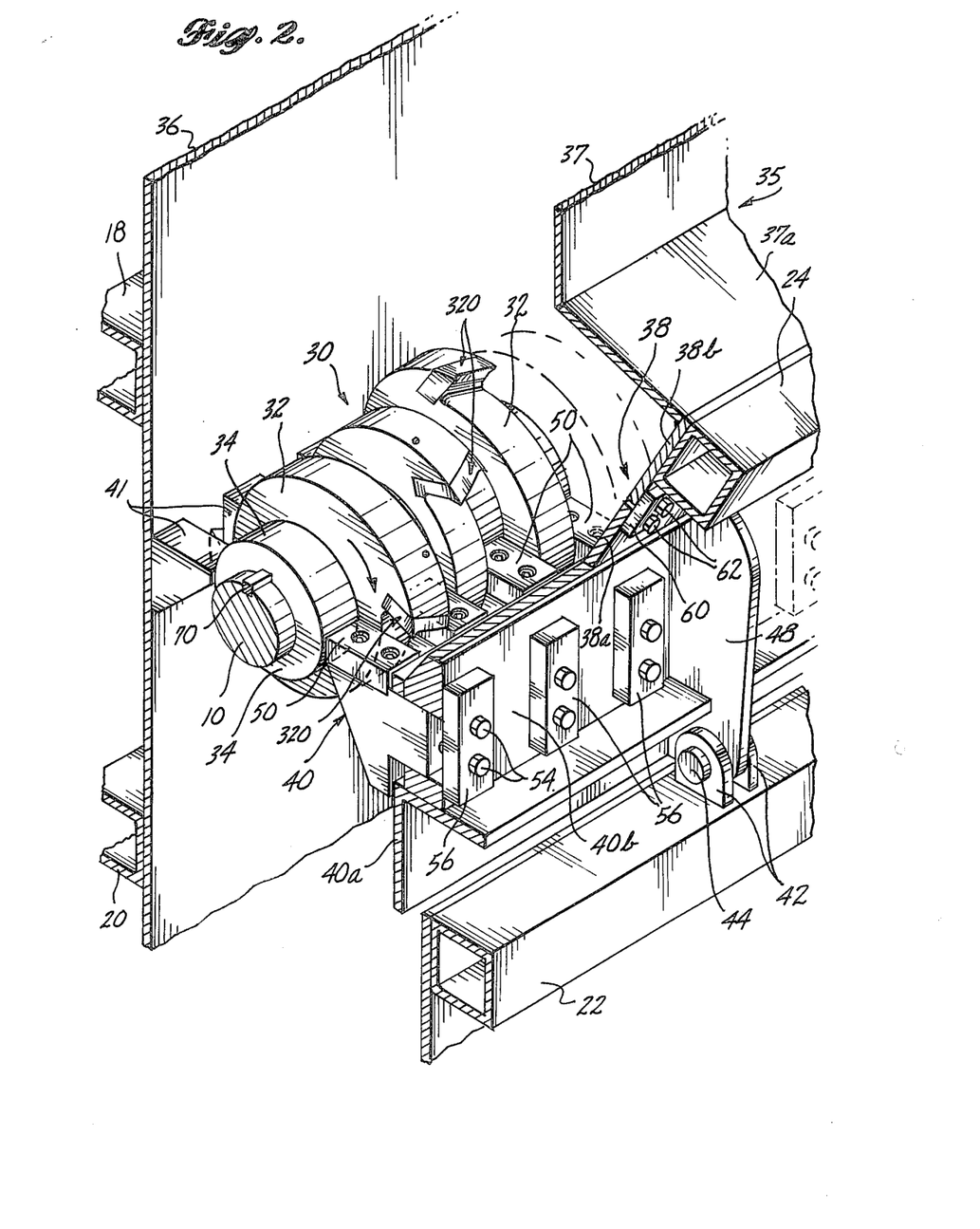
FIG. 2 is an isometric view of the sectionally illustrated machine depicted in FIG. 1.
Figure 3:
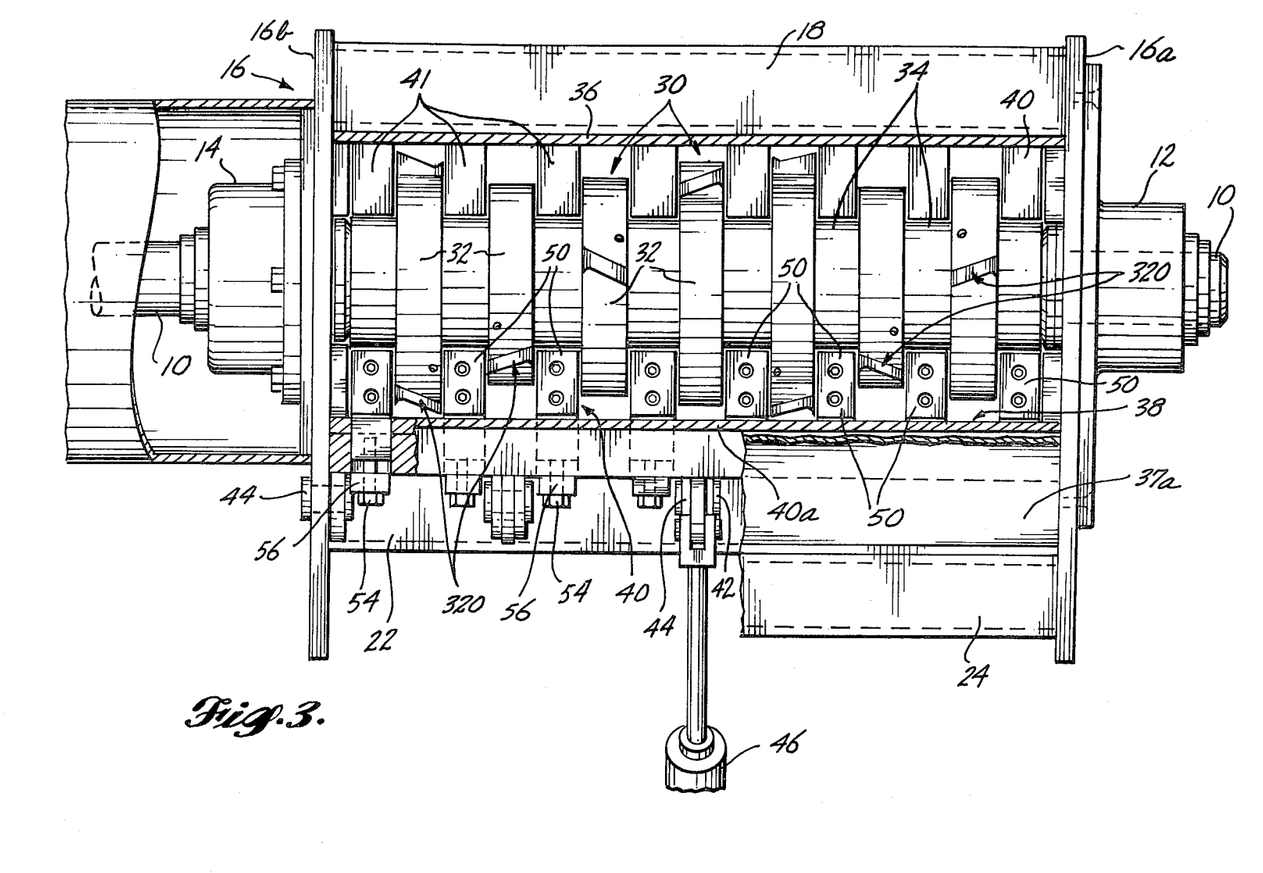
FIG. 3 is a top view of the machine illustrating the cutter and the toothed rack displayed at full length.
Figures 4, 5, 6, 7:
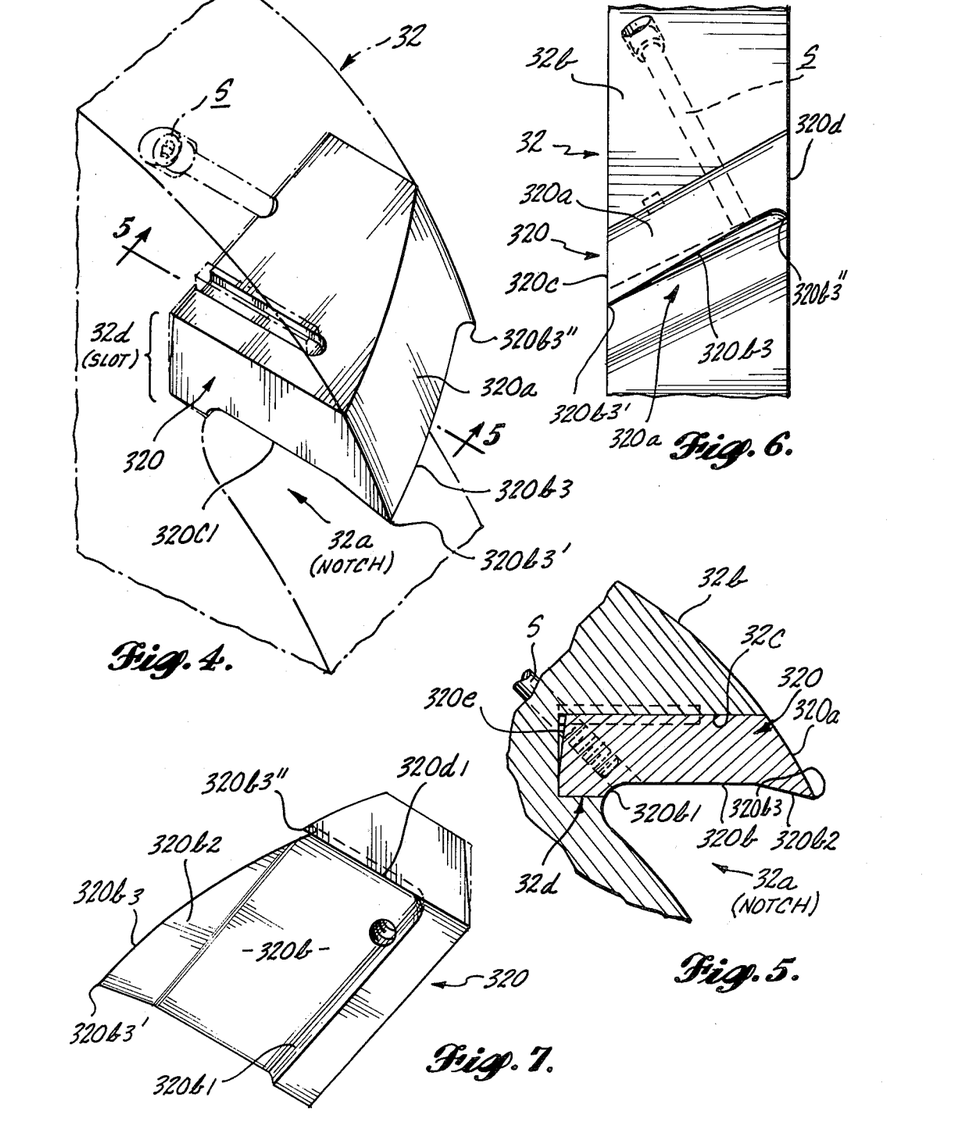
FIG. 4 is a perspective view of a cutter bit enlarged to show details.
FIG. 5 is a sectional view taken on line 5—5 in FIG. 4.
FIG. 6 is an end view (taken in the cutter plane) showing a mounted tooth.
FIG. 7 is a face view of the cutter bit seen looking against the direction of rotation thereof.

Frame plates 16a and 16b are maintained in spaced-apart, upright positions by longitudinal parallel frame members 18, 20, 22 and 24. Frame members 18 and 20 support an upright wall panel 36 adjacent and parallel to one side of the rotary cutter 30. Panel 36 extends both above and below the cutter as shown in FIG. 1. Above the cutter, panel 36 terminates in a section 36a angled away from the opposing vertical hopper wall 37. Just above the cutter 30, wall 37 terminates in a section 37a angled downwardly and outwardly away from the cutter 30. A two-part plate 38 projects above the level of the cutter, angling outwardly from the cutter to the lower edge of panel 37a. Plate 38 includes a lower segment 38a aligned with a stationary upper segment 38b. The latter is fixedly mounted on the frame member 24. The two segments are joined together by a splint plate 60 and bolts 62. The plate assembly 38 is structurally combined with a multitoothed rack assembly 40. The plate assembly 38 and underlying rack assembly 40, specifically rack bar 40a, are pivotally mounted as a unit by pivotal supports 42 on horizontally aligned lugs 44 carried by the frame member 22. A hydraulic actuator piston and cylinder unit 26 pivotally connected to a stiffener rib 48 on the backside of the assembly is operable to advance and retract the assembly about the common axis of pivots 42 between its normal operating position illustrated in FIG. 1 and its broken-line retracted position illustrated in the same figure. When the connecting bolts 62 are removed and the assembly is retracted from the cutter 30, the rack teeth 50 may be repaired or replaced individually as need be. However, with plate assembly 38 in its normal operating position, it cooperates with the panels 37a, 37 and with the cutter 30 and rack assembly 40 to form a hopper base lobe or holding compartment T into which tires dropping onto the cutter 30 are thrown and tumbled about with successors until shredded as generally depicted in the sequence of views, FIGS. 8–10. Holding compartment T has a height greater than the width and less than the diameter of tire carcasses to be shredded. The hopper base portion has a throat I entering compartment T wider than the widest tire to be shredded.

The rack assembly 40 includes a horizontal row of successively spaced teeth 50 that are mounted to project into and largely occupy the spaces between successive cutter disks 22. The upper faces of the rack teeth lie substantially in the horizontal plane of the axis of the cutter. The teeth in operative position of the rack project into close proximity with the peripheral surfaces of the spacer disks 34 that separate the cutter disks. The parallel flat side faces of the cutter disks lie close to the adjacent parallel side faces of the rack teeth 50. Clearance distance between the side faces should be of the order of a few hundredths of an inch.

The rack teeth are formed and mounted to be removable from their support bar structure 40a, 40b. Individual pairs of bolts 54 threaded into the backside shank portions of the teeth draw the teeth against the rims of associated apertures in the rack bar 40b, the bolt heads of each pair reacting against a backing plate 56 positioned against the backside of the rack bar 40b.

Each of the disk-like rotary cutters 32 has two flat sided cutting bits 320 removably mounted in obliquely formed notches 32a at 180° spacing in the peripheral surface 32b of the cutter disk. From the base of each disk notch 32a, the disk's outer peripheral surface 32b spirals gradually outward at increasing radius to the reversely angled face 32c of the other notch which turns abruptly inward at a sharp acute angle. Face 32c forms one side of a shallow cutter bit holder slot 32d formed in the base of notch 32a.

Each cutter bit 320 is held fast in its holder slot in the base of the associated cutter disk notch 32a by an Allan Head machine screw S threaded and tapped into the cutter bit 320. The base end of cutter bit 320 has a chamfered face 320e so as to assure firm face to face seating of the lagging face of the cutter bit against the backing wall 32c. This makes less critical the tolerance requirements in machining the cutter bit and notch slot walls. As shown best in FIGS. 4–7, each cutter bit 320 has a peripheral surface 320a contoured such that when mounted it forms a smooth continuation of the cutter disk periphery. It has a surface 320b facing in the direction of rotation, but angled outwardly and forwardly to form an acute angle relative to the general arcuate extent of its peripheral surface. The radially inner portion 320b1 of surface 320b turns into a concave fillet (as a machining convenience) and the radially outer portion 320b2 thereof approaching the cutting edge 320b3 is even more sharply angled to form a sharp acute angle with the bit's peripheral surface where the two intersect. The cutting edge 320b3 extends, from a sharply pointed tip 320b3', obliquely rearward from cutter bit side face 320c to a location near the opposite side face 320d, where it again sweeps forwardly to form a secondary cutter edge tip 320b3". Thus, with the cutter rotating, the two points 320b3' and 320b3", and particularly the former, gouge into the carcass wall by impact thereon and, due to the angular set of the subjoining face 320b-329b2, immediately draw the carcass material toward the cutter. This helps complete the cutter bit penetration and starts the formation of a cutter-wide flap-like formation shredding cut. The gouging and drawing action of the cutters also provide a self-feeding action of the carcass, assisting gravity in maintaining progressive feeding of the tire against the cutter. The system thereby avoids any need for complex of cumbersome feed mechanisms in order to achieve high shredding production rates. Side edges 320c1 and 320d1 serve as shearing edges working cooperatively with the respectively adjacent rack bar teeth edges to shear off the sides of the flap-like shredding cut as cutter rotation continues. Finally, the root portions of the cutter bits cooperate with the two adjoining bar teeth tips to tear the flap or "shred" free of the carcass wall.

Along the length of cutter shaft 10, the successive cutters 32, interdigitated with the rack bar teeth 50, are rotationally offset from each other circumferentially by uniform angular increments, there being seven such cutters in the example. The aligned cutters, each with two opposed cutting bits, thereby divide the 360° of circumference into fourteen equal increments. In this way, the work impact reaction forces of the cutter bits impinging against the tire are spread over the rotation cycles, minimizing heavy frame loading stresses and avoiding heavy pulsations of drive power demand. The smoothness of action and the uniformity of loading along the length of the cutter is still further improved by alternately reversing the angular "set" of the oblique cutting edges of successive cutter bits 320 in the series, such that any lateral component of cutting forces on a tire carcass or portion thereof attributed to oblique slant of the cutter bit edges tend to average out as the successive cutter bits in turn impinge the material.

Each of the cutter bit disks 32 and spacers 34 is rotationally locked to arbor 10 by key 70 and is slidable longitudinally on the arbor 10 for individual removal and replacement as need requires. The angular locations of the cutter disk key slots in the successive disks, of course, determine their respective angular positionings about the shaft.

Barrier teeth 41 project from back wall 36 into the spaces between cutters.

A geared drive motor unit (not shown) is connected to the arbor shaft 10 to drive the cutter at desired speed. In practice, a speed of the order of 50 revolutions per minute is considered about optimum with the outer diameter of the cutter bits of the order of twenty inches and the width of the individual cutters and spacers 32 and 34, respectively, of the order of three inches. At this slow speed, heat generation in the rubber is minimized and attendant energy losses are kept within acceptable limits. With this set of dimensions and rotative speed of the cutter, tires are shredded efficiently into pieces averaging three inches and smaller across the face in any direction. The total length of the cutter assembly is in excess of the diameter of the largest tire to be processed by the unit; in the illustration something over three feet in length.

Figures 8, 9:
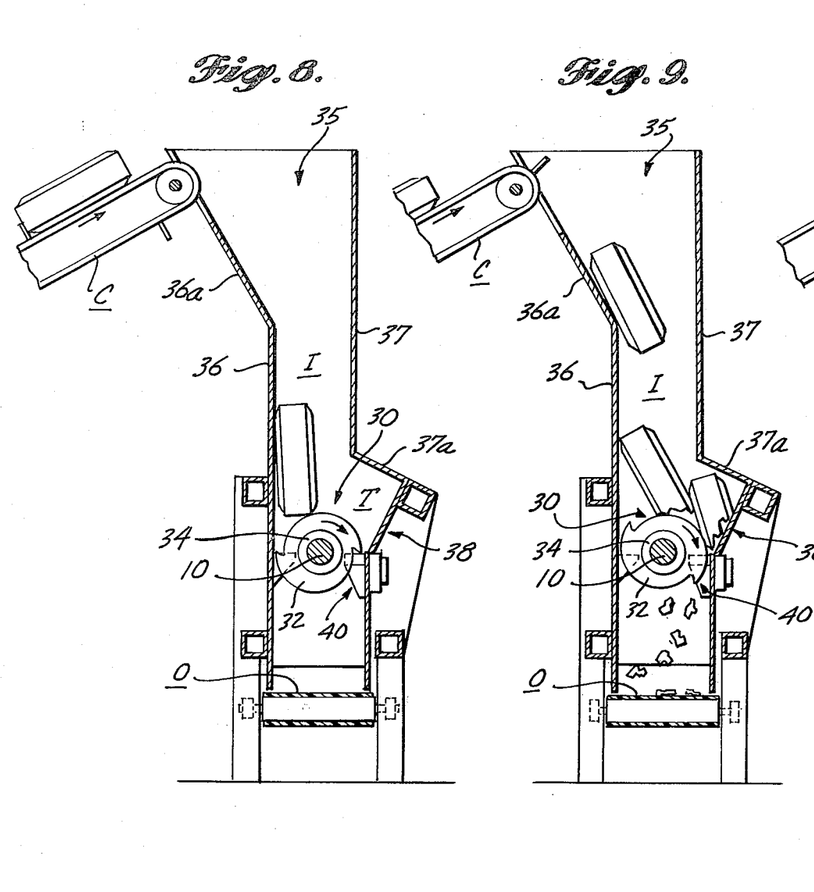
FIGS. 8, 9 and 10 are sequential operating side sectional views illustrating the shredding of tires being fed to the machine.
Figure 10:
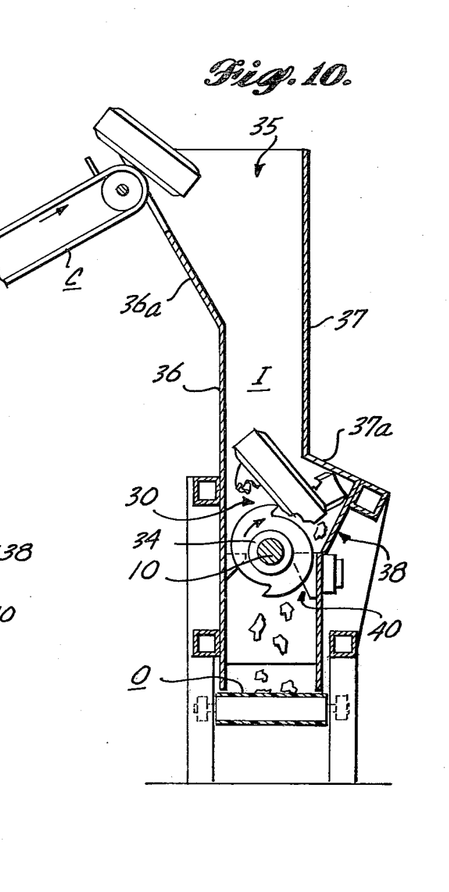

As shown in FIGS. 8-10, tire carcasses to be shredded, relieved of rim reinforcement cables, as dropped off the infeed conveyor C into hopper 35 and down upon the rotating cutter 30. In the process of initiating the shredding action on the carcass, it is thrown toward compartment T and followed by other carcasses similarly treated. The result is a cramming and tumbling of the diminishing carcasses as the process continues, with the compartment T adding to the volume-handling capacity of the cutter over what is found to be possible with a confined or narrow hopper base, allowing only the edge of one tire at a time to be presented to the cutter.

Due to the smoothly averaged reaction forces on the cutter during each rotation cycle, drive power required by the cutter, hence the cost of the drive unit, is kept at a minimum. Capability of the cutters to produce chunks or shreds generally of the same order of size indicated, with relatively few "fines" produced in so doing, also contributes greatly to saving of energy. The self-feeding action of the cutter also expedites the process and simplifies the apparatus. The severed pieces are driven downwardly immediately away from the field of cutting and onto an offbear conveyor 0, so they do not linger and cause unnecessary abrasive heating or interference with oncoming material to be cut. Tires are shredded virtually as fast as they can be delivered to the shredder. The action being something other than slicing, the cutter bit edges need not be or remain knife sharp to be effective and, therefore, need not be removed and sharpened frequently. The machine is thus capable of sustained efficient operation over long periods with little or no down time.

Accordingly, the invention has been disclosed in its preferred embodiment with the understanding that minor modifications and changes with respect to details may be made, but that the novel concepts are as set forth and as defined in the accompanying claims.

In such claims the invention is defined in terms of its application to shredding of tire carcasses as disclosed with the understanding that alternative embodiments for this and other shredding applications are intended to be covered as well under principles of equivalency.

The embodiments of the invention in which an exclusive property or privilege is claimed are defined as follows:

1. A shredder operable to shred vehicle tire carcasses comprising a feed hopper including a descending chute cross-sectionally configured and dimensioned so as generally to both orient and guide the tires in a path of descent, a driven elongated shredder rotor of generally cylindrical configuration mounted extending horizontally across said path of descent with a first side of the rotor substantially adjacent one side of said path, said hopper having a widening recess extending laterally outward from the opposite, second side of the chute path at the level of the rotor axis and for a predetermined height above the same, so as to accommodate the lower portion of the tire swung laterally into the same over the top of the rotor, said rotor comprising a series of disc-like cutters successively spaced from each other and each with a circumferentially projecting cutting element extending from side to side thereof and formed by radially inner and outer faces mutually converging at an acute angle forwardly in the direction of cutter rotation to a cutting edge sharpened so as to pierce through the tire as it bottoms into engagement with the cutter and thereby initiate cutting a flap-like segment out of the tire and, conjointly therewith, initate lateral advancement of the bottom portion of the tire toward said recess, and shredder tooth means comprising a generally horizontal series of successively spaced teeth mounted to project generally horizontally from the hopper's second side substantially at rotor axis level into interdigital relationship with the successive cutters and with side edges in closely spaced relationship with such cutters for shearing of the tire rubber at such side edges by cutting element rotation past the same.

2. The shredder defined in claim 1 wherein the cutting elements of successive cutters in the series are progressively offset from each other circumferentially about the rotor axis.

3. The shredder defined in claim 1 wherein the hopper recess rises above the top of the rotor by a distance less than the tire diameter.

4. The shredder defined in claim 3 wherein the outer side of the hopper recess slopes upward and outward from the chute path to a maximum lateral distance from said first side of the chute path at least approximately as great as the tire diameter.

5. The shredder defined in claim 1 further including a second generally horizontal series of successively spaced teeth mounted to project inwardly horizinterdigital relationship with the cutters from the hopper side opposite the first shredder tooth means.

6. The shredder defined in claim 1 wherein the cutting element cutting edges lie substantially in a common cylindrical pattern and each is angled to the rotor axis to form a forwardly projecting primary tire penetrating point at one side of the cutter.

7. The shredder defined in claim 6 wherein the rotor's cutting element cutting edges of successive cutters in the series are alternately angled oppositely to the rotor axis to produce mutually offsetting cutting reaction force components directed parallel to the rotor axis.

8. The shredder defined in claim 6 or 7 wherein each cutter has a plurality of such cutting elements equally spaced apart about the periphery thereof, each cutter having a circumferentially extending peripheral surface decreasing spirally in radius away from the cutting edge of each cutting element toward the next following cutting element on such cutter.

9. The shredder defined in claims 6 or 7 in which each cutting edge sweeps forwardly in the direction of convergence of said faces to form a forwardly projecting second tire penetrating point at the side of the cutter opposite the primary point.

10. In a shredder for tires, a feed hopper and a shredder mechanism therein, such shredder mechanism including an elongated rotor of generally cylindrical configuration horizontally mounted in said hopper to shred tires descending therein, said rotor comprising a series of disc-like cutters successively spaced from each other and each with a circumferentially projecting cutting element formed by radially inner and outer faces mutually converging at an acute angle to a cutting edge sharpened to pierce through the tire carcass as it bottoms into engagement with the cutter, thereby initiating cutting a flap-like segment out of the tire, said cutting edges lying substantially in a common cylindrical pattern and with each cutting edge angled to the rotor axis to form a forwardly projecting tire penetrating point at one side of the cutter, and shredder tooth means including a generally horizontal series of successively spaced teeth mounted in the hopper substantially at the level of the rotor axis with the successive teeth projecting generally horizontally into interdigital cooperative relationship with the successive cutters on the downturning side thereof so as to shear the sides of the cut flapped segments from the tire as the cutting elements pass such teeth.

11. The shredder defined in claim 10 wherein the rotor's cutting element cutting edges of successive cutters in the series are alternately angled oppositely to the rotor axis to produce mutually offsetting cutting reaction force components directed parallel to the rotor axis.

12. The shredder defined in claims 10 or 11 in which each cutting edge sweeps forwardly in the direction of convergence of said faces to form a forwardly projecting second tire penetrating point at the side of the cutter opposite the primary point.

13. The shredder defined in claims 10 or 11 wherein each cutter has a plurality of such cutting elements equally spaced apart about the periphery thereof, each cutter having a circumferentially extending peripheral surface decreasing spirally in radius away from the cutting edge of each cutting element toward the next following cutting element on such cutter.

14. The shredder defined in claims 10 or 11 in which the cutting elements of successive cutters in the series are offset from each other circumferentially about the rotor axis.

* * * * *

UNITED STATES PATENT AND TRADEMARK OFFICE
CERTIFICATE OF CORRECTION

PATENT NO. : 4,394,983
DATED : July 26, 1983
INVENTOR(S) : Carl M. Ulsky

It is certified that error appears in the above—identified patent and that said Letters Patent is hereby corrected as shown below:

Column 3, line 61, "26" should be —46—

Column 7, line 18, "horizinter-" should be —horizontally into inter- —

Signed and Sealed this

Eighth Day of November 1983

[SEAL]

Attest:

GERALD J. MOSSINGHOFF

Attesting Officer        Commissioner of Patents and Trademarks